June 6, 1961　　　　M. GONDOUIN　　　　2,987,668
SYSTEMS FOR WELL LOGGING
Filed May 29, 1956　　　　　　　　　　　　3 Sheets-Sheet 1

*INVENTOR.*
MICHEL GONDOUIN

BY

HIS ATTORNEY

June 6, 1961 M. GONDOUIN 2,987,668
SYSTEMS FOR WELL LOGGING
Filed May 29, 1956 3 Sheets-Sheet 2

INVENTOR.
MICHEL GONDOUIN
BY William P. Sherman
HIS ATTORNEY

June 6, 1961 M. GONDOUIN 2,987,668
SYSTEMS FOR WELL LOGGING
Filed May 29, 1956 3 Sheets-Sheet 3

INVENTOR.
MICHEL GONDOUIN
BY *William R. Sherman*
HIS ATTORNEY

United States Patent Office 2,987,668
Patented June 6, 1961

2,987,668
SYSTEMS FOR WELL LOGGING

Michel Gondouin, Ridgefield, Conn., assignor, by mesne assignments, to Schlumberger Well Surveying Corporation, Houston, Tex., a corporation of Texas
Filed May 29, 1956, Ser. No. 588,023
18 Claims. (Cl. 324—6)

The present invention relates to well logging and pertains, more particularly, to methods and apparatus for deriving information concerning earth formations traversed by a borehole, based upon their electrical properties.

In copending application Serial No. 583,977, filed May 10, 1956, now Patent No. 2,881,385 by M. Gondouin and entitled "Well Logging Apparatus," well logging systems are disclosed which employ one or more toroidal coils for detecting a selected portion of current emitted from an electrode which is lowered into a well. In such systems, a considerable amount of current is emitted from the electrode to which the toroidal coil is not responsive, such current serving to confine the selected portion of current passing in a beam through the corresponding toroidal coil.

It is an object of the present invention to provide new and improved methods and apparatus not only for magnetically detecting the flow of current in conductive fluids but also for magnetically inducing such flow to derive information concerning the electrical properties of earth formations.

It is another object of the present invention to provide new and improved methods and apparatus of the above character for producing signals characterizing the conductivity or resistivity of earth formations.

Another object of the invention is to provide new and improved methods and apparatus of the above character for magnetically inducing and detecting a flow of current along a defined path into formations traversed by a borehole.

A further object of the invention is to provide such methods and apparatus whereby indications of the resistivity or conductivity of formations in a region closely adjacent the borehole may be derived.

Still another object of the invention is to provide well logging methods and apparatus whereby detailed delineations of formations in accordance with their conductivity may be derived.

These and other objects are attained, in accordance with the invention, by energizing one of a pair of toroidal coils spaced along a passage defined by insulating means, a portion of the insulating means being disposed about an opening of the passage and resiliently urged into sealing engagement with the borehole wall. The coil which is energized produces a flow of current through the opening into adjacent formations, while signals are derived from the other coil representing the amount of current flowing through the opening. In response to such signals, indications of formation conductivity or resistivity are derived.

In one form of the invention, the toroidal coils are spaced along a passage extending transversely through an insulating cushion member, the face of which is resiliently urged into conforming contact with the borehole wall. In another embodiment, the coils are spaced at either opening of the passage through an insulating cushion member, the openings being spaced along the borehole and formed in the face of the cushion member. An annular opening is provided in another form of the invention by annular insulating means spaced above and below the opening and defining a passage extending along the borehole in communication with the opening. In another form, a pair of toroidal coils is spaced along a passage having an opening in the face of a cushion member urged against the borehole wall. Centrally of this opening is the exposed surface of an insulated electrode extending centrally through the passage for emitting current into the adjacent formations. The excitation of one coil is controlled by a feedback circuit to maintain constant the potential induced in the other coil, whereby a substantially uniform density of current passing into the formation is maintained. In a further embodiment, a different feedback circuit effects such control.

Other objects and features of the invention will be apparent from the following detailed description of several typical embodiments thereof, taken in conjunction with the accompanying drawings, in which.

Figure 1:
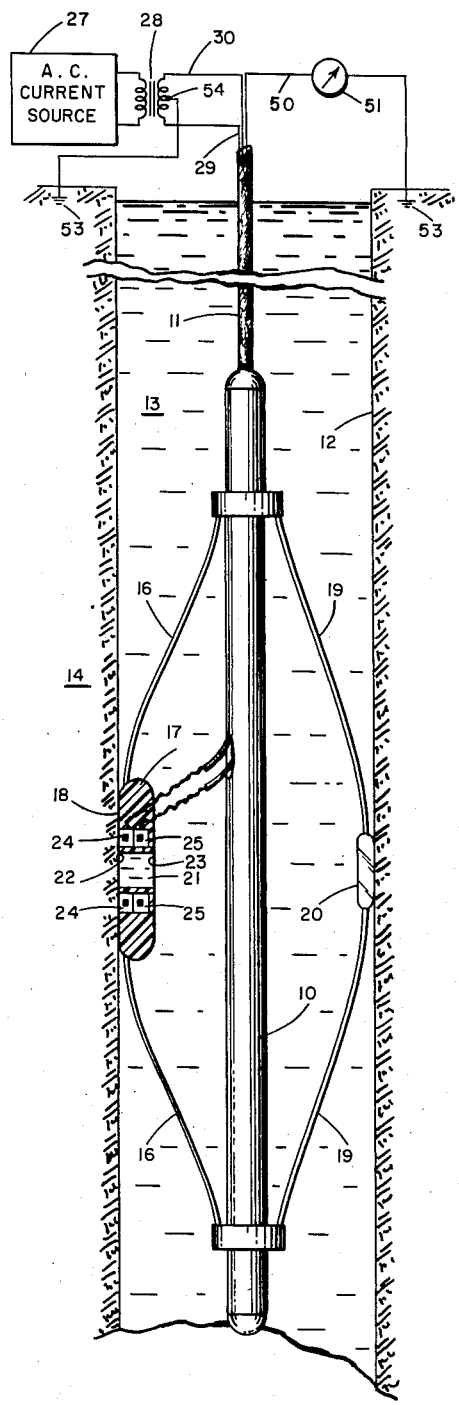
FIG. 1 is a schematic diagram of a well logging system constructed according to the invention.

In FIG. 1 is shown an elongated housing 10 supported by a cable 11 for movement through a borehole 12 which contains conductive fluid 13, past formations 14 to be investigated. The conductive fluid 13 may be a suitable weighting fluid, such as drilling mud, salt water or other electrolyte of a type employed in drilling or workover operations on wells. Supported from the housing 10 by bowed springs 16 is a cushion member 17 composed of insulating material, such as rubber or a rubber substitute, and having a face 18 cylindrically contoured to conform with the borehole wall. Supported from a second set of bowed springs 19 extending oppositely from the bowed springs 16 is a back-up plate 20 serving to engage the borehole wall at a point diametrically opposite from the cushion member 17. Thus, the cushion member is resiliently urged by bowed springs 16, 19 toward the borehole wall to promote sealing engagement between the wall and conforming face 18.

The cushion member 17 may have a generally oval face elongated axially of the borehole. Extending through the cushion member 17 transversely with respect to its face 18 is a passage 21 containing conductive fluid 13 and having an opening 22 in the face 18 disposed centrally with respect to its periphery. The other opening 23 of the passage 21 is exposed directly to the conductive fluid 13 within the borehole 12. A conductive path is then provided which extends from the opening 23 through the passage 21 to the opening 22 and into the adjacent formations, returning via the column of conductive fluid 13 to the opening 23. Toroidal coils 24, 25 are spaced along passage 21 and encircle the conductive path therethrough.

Figure 2:
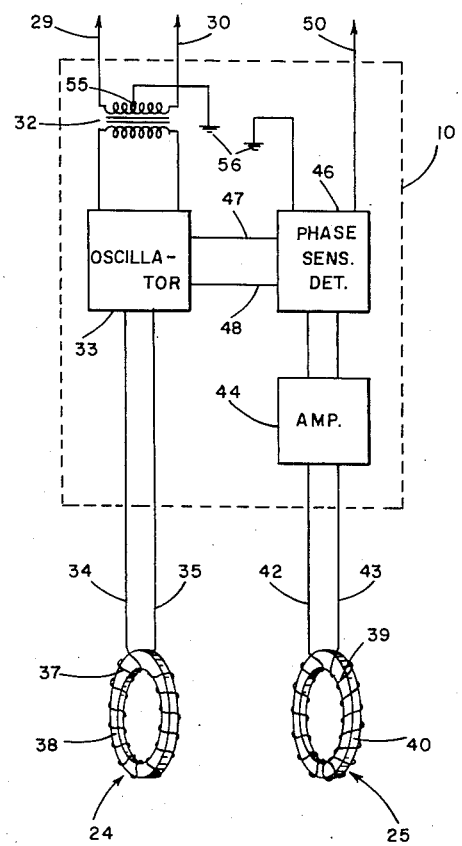
FIG. 2 is a schematic diagram of certain portions of the circuitry for the apparatus of FIG. 1.

To pass current through this conductive path, the toroidal coil 24 is coupled to an energizing circuit. As seen in FIGS. 1 and 2, the energizing circuit may comprise a source 27 of alternating current coupled at the earth's surface by a transformer 28 to cable conductors 29, 30. Power transmitted through cable conductors 29, 30 is coupled by a transformer 32 within housing 10 to the input of an oscillator 33. Oscillator 33 may be of any suitable type serving, for example, to supply a constant current $i_e$ of a frequency different from the frequency of the A.C. current source 27. By way of example only, the output frequency $f$ of oscillator 33 may range between 10 and 100 kilocycles per second. Insulated conductors 34, 35 serve to connect the output terminals of oscillator 33 to the helical winding 37 formed on toroidal core 38 of toroidal coil 24.

To minimize stray magnetic fields which may be associated with the toroidal coil 24, its core is preferably composed of a relatively high permeability material and its winding 37 is wound in canceling clockwise and counter clockwise progressions. Stray electric fields which may result in capacitive coupling between the coils 24, 25 are also preferably minimized, as by applying suitable shielding about the coil. Desirably, the coils 24, 25 are of identical construction and have a minimum of stray inductive and capacitive coupling, being inductively coupled only with the conductive path through their axial passages. Over the shielding of each of the coils 24, 25 is a surrounding cover of insulation which may be provided by the insulating material of the cushion member 17 or other suitable insulation.

The toroidal coil 25 is spaced along the passage 21 with its axis coincident with the axis of coil 24. Winding 39 which is carried by core 40 of toroidal coil 25 has its terminals connected by insulated conductors 42, 43 to the input terminals of an amplifier 44 of any suitable design. Amplifier 44 serves to develop an amplified version of the potential difference induced in the winding 39, which is applied to the input circuit of phase sensitive detector 46. Conductors 47, 48 apply a sensitizing signal from oscillator 33 to the reference circuit of the phase sensitive detector 46, whereby its output is a rectified version of that component of the amplifier output signal which is in phase with the excitation signals applied to toroidal coil 24. Such rectified version constitutes a measure signal and is supplied via cable conductor 50 to a suitable indicating device 51 at the earth's surface. Indicating device 51 may, for example, conveniently be a galvanometric recorder of the type commonly employed in well logging and serving to provide a record of measure signal variations as a function of the depth of housing 10 in the borehole 12. To provide a ground return for the measure signal circuit, one terminal of the indicating device 51 is connected by conductor 52 to a ground point 53, this ground point 53 also being connected to midtap 54 of the secondary winding of transformer 28. The primary winding of transformer 32 in the housing has its midtap 55 connected to a ground point 56, to which one output terminal of phase sensitive detector 46 is also connected. This ground return circuit, which is of the phantom type, minimizes the required number of cable conductors, although an additional cable conductor may be employed for a ground return if desired.

In an exemplary operation the apparatus of FIGS. 1 and 2, the housing 10 is moved at a desired rate of speed through the borehole 12 past formations to be investigated while the record of device 51 is correspondingly advanced. As the housing moves, the resiliency of bowed springs 16, 19 urges the cushion member 17 and back-up plate 20 in opposite directions outwardly so as to maintain their outer faces in contact with the borehole wall. The face 18 of cushion member 17 serves to provide an insulating seal about the opening 22 of passage 21, thereby to prevent the conductive fluid 13 from presenting a short circuit path extending from the opening 22 along the wall of the borehole across the face 18 of the cushion member. A conductive path leading from the opening 22 into the adjacent formations and returning through the conductive fluid 13 about the periphery of the cushion member to its rear opening 23 is thus established.

As the cushion member is moved along the borehole, oscillator 33 serves to energize the winding 37 of the toroidal coil 24 to produce an alternating magnetic flux in the core 38 which circulates about the passage 21. This flux induces a flow of current through the passage 21 in the conductive fluid contained therein. The current penetrates into formations opposite the opening 22 and is guided along a return path to the opening 23 by the insulating material of the cushion member 17. Thus, the current follows a closed path, the cross section of which changes to produce the greatest current density through the passage 21 and a short distance into the adjacent formations. Since the conductivity of the formations is generally less than the conductivity of the fluid 13 by a significant factor, the amount of current flow is determined primarily by the conductivity of the formation material which is opposite the opening 22. Where the opening 22 is of relatively limited dimensions, the variations in current reflect a corresponding variation in the conductivity of an effectively small volume of formation material closely adjacent the borehole wall.

All of the current passing through the central passage of toroidal coil 24 also passes through the passage of toroidal coil 25, since the insulating material of the cushion member 17 defines a single continuous passage through these coils. The alternations in this current result in production of an alternating magnetic flux in the core 40 of pick-up coil 25, which alternating flux induces a potential difference in the winding 39 of coil 25 for application to the input of amplifier 44.

When an energizing current $i_e$ is passed through winding 37 of coil 24, a potential $e_r$ is produced in the winding 39 of coil 25 due to the flow of current $i_c$ through the conductive path. For a given frequency $f$ of the energizing current $i_e$, the induced potential $e_r$ is given by the following relation:

$$e_r = KCi_e f^2 \qquad (1)$$

where K is a constant determined by the geometry and design of the coils 24, 25 and C is the conductance of the current path through the formations. By maintaining the frequency $f$ and the energizing current $i_e$ constant, the potential $e_r$ applied to the input of amplifier 44 is made to represent the conductivity of formations adjacent the opening 23.

If spurious coupling between the coils 24, 25 exist, there is a signal induced in the winding of coil 24 which is out of phase with the potential output of oscillator 33, the potential $e_r$ being in phase with the oscillator potential. To reject the spurious signal component and to derive a rectified version of the signal $e_r$, the output of amplifier 44 is rectified by the phase sensitive detector sensitized at the phase angle of the oscillator output potential. Accordingly, the measure signal supplied by the phase sensitive detector 46 to the indicating device 51 is accurately representative of conductivity along the path of current flowing through the passage 21 and into the formations opposite the cushion member 17.

It will be evident from Expression 1 above that formation conductivity may be measured by keeping the frequency $f$ constant and measuring the energizing current $i_e$ necessary to keep the potential induced in coil 25 constant. Alternatively, the energizing current $i_e$ may remain constant and the frequency necessary to maintain the induced potential $e_r$ constant may be detected as a measure of conductivity. Generally, however, it is more convenient to maintain the frequency and the energizing current constant, as shown in FIGS. 1 and 2, and to measure the induced potential $e_r$. While an identical construction of coils 24, 25 facilitates the elimination of spurious coupling therebetween, the coils may be of different diameter and may be arranged concentrically in a common plane rather than spaced in the direction of their axes, if desired.

Figure 3:
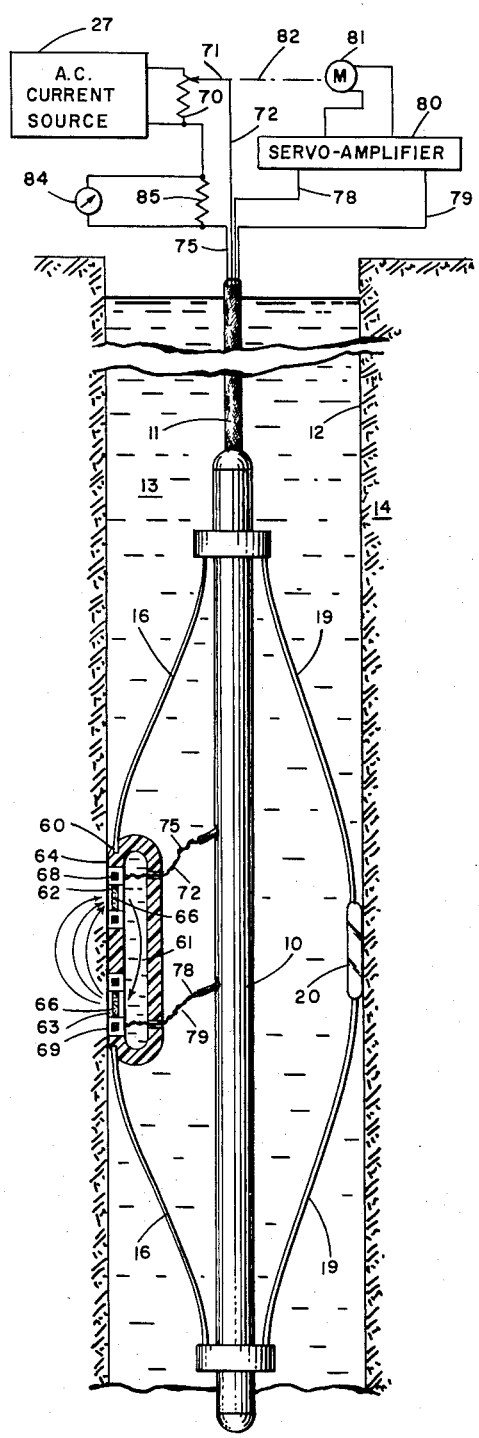
FIG. 3 is a schematic diagram of another form of the invention in which the toroidal coils are placed at either opening of an insulated passage.

In FIG. 3 is shown a well logging system constructed in accordance with another embodiment of the invention wherein the energizing current $i_e$ necessary to maintain the induced potential $e_r$ constant is measured as an indication of formation resistivity. A different cushion member 60 is also employed, in lieu of cushion member 17, so that the indications derived are affected by a volume of formation material having a different geometry.

More particularly, the cushion member 60 is of hollow construction to define an interior passage 61 connecting upper and lower openings 62, 63 spaced along the borehole in the face 64 of the cushion member. In each of openings 62 and 63 in a permeable membrane 66, composed of microporous rubber or the like, which serves to retain a suitable electrolyte within the passage 61. Such electrolyte may be in the form of a salt solution, for example, or of an electrolytic gel and provides a conductive path interiorly of the cushion member 60 between openings 62, 63 which is insulated from the conductive fluid 13 surrounding the cushion member.

With the face 64 of cushion member 60 urged into engagement with the borehole wall by the bowed springs 16, 19, the insulating material, such as rubber or the like, of which the cushion member 60 is composed, forms a seal separately encircling each of the openings 62, 63 to prevent creation of a short circuit path between the openings by intrusion of the conductive fluid 13 between the face 64 and the borehole wall.

Encircling one of the openings, such as the upper opening 62, is a toroidal coil 68 which may be of a construction identical to toroidal coil 24. A toroidal coil 69 which may be of the same construction similarly encircles the other, lower openings 63. The coils 68, 69 are thus arranged so that the insulating material of the cushion member 60 defines a single continuous passage 61 extending through each of them and communicating in sealed relation with the adjacent formations. To energize one of the coils, such as coil 68, the alternating current source 27 is connected to a potential divider 70 having its wiper 71 connected to cable conductor 72. In accordance with the position of the wiper 71, a current is passed through cable conductor 72 to a winding of toroidal coil 68, returning via cable conductor 75 to the source 27. This energizing current $i_e$ causes a flow of alternating current through the passage 61 which passes between the opening 62, 63 through the adjacent formations.

The potential induced in the winding of toroidal coil 69 by this flow of current is coupled by cable conductors 78, 79 to the input terminals of a servo amplifier 80 serving to control the direction and travel of a servomotor 81. The servomotor is mechanically coupled, as by a shaft 82, to the wiper 71 and is controlled degeneratively by the servo amplifier 80 to move the wiper 71 in a direction which serves to maintain the potential induced in coil 69 constant. By maintaining the frequency of the source 27 constant and controlling the energizing current $i_e$ so as to maintain the induced potential $e_r$ constant, the indications of the energizing current provided by an indicating device 84 connected across a resistor 85 in series with the energizing current circuit are representative of formation resistivity.

Thus, in an exemplary operation of the apparatus of FIG. 3, the cushion member 60 is moved past formations to be investigated, with the circuits energized. As the effective resistivity of formation materials in the volume underlying the cushion member 60 and intermediate the openings 62, 63 varies, current circulating through the passage 61 and the formation materials tends likewise to vary for any given energization of the coil 68. Assuming, for example, that the effective resistivity of the formation materials increases, the amount of current flowing through the formation materials and returning via the electrolyte in passage 61 tends to decrease, thereby decreasing the potential $e_r$ induced in the pick-up coil 69. In response to this reduced potential, servo amplifier 80 controls motor 81 to move the wiper 71 upwardly to increase the energization of the emitter coil 68. The magnitude of current circulating the conductive path between openings 62 and 63 is thereby restored to a fixed value to maintain the potential $e_r$ induced in the coil 69 constant.

If the Expression 1 given above is rewritten to relate the energizing current $i_e$ to resistivity R, it may be of the form:

$$i_e = \frac{e_r}{Kf^2} R \tag{2}$$

thus showing the direct proportionality of the energizing current $i_e$ to the resistivity R. Accordingly, indicating device 84, which may be a galvanometric recorder-like device 51 of FIG. 1, provides a log of resistivity values as a function of depth.

If desired, of course, the cushion member 60 may simply be substituted for the cushion member 17 of FIG. 1, the toroidal coils 68 and 69 being connected in the circuit of FIG. 2 in correspondence to coils 24 and 25, respectively. In this way, indications of formation conductivity may be derived with the cushion member 60.

Figure 4:
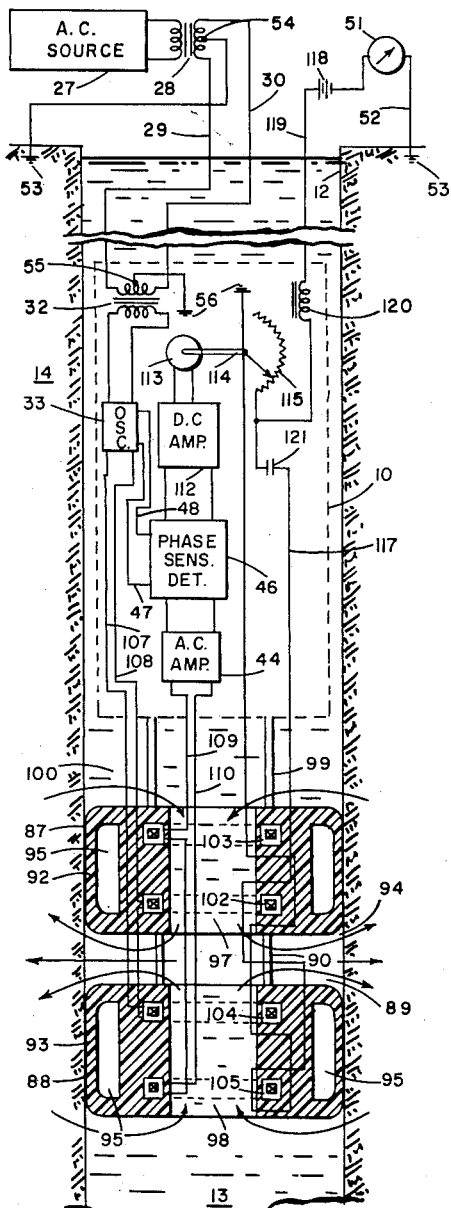
FIG. 4 is a schematic diagram of another embodiment wherein the opening is of annular configuration.

In another form of the invention, shown in FIG. 4, indications of formation resistivity are obtained without requiring a control of the energizing current. Moreover, the path of current introduced into the formations may be characterized as an annular sheet rather than a beam of the type produced with cushion members 17 or 60. In this embodiment, the toroidal coils are carried by annular packing elements 87 and 88 which are spaced in the direction of their axes along the borehole to provide a laterally opening, annular passage 89 therebetween. Spaced support members 90 bridge the passage 89 to connect the packing elements 87, 88 in fixed, spaced relation.

The packing elements 87, 88 are suitably composed of a flexible insulating material, such as rubber or a rubber substitute, and have peripheral face portions 92 and 93, respectively, for resiliently sealing with the borehole wall above and below the annular opening 94 of passage 89. Sufficient resiliency to ensure a sealing engagement with the borehole wall may be obtained in any convenient way, such as by providing a gas filled cavity 95 underlying each face portion. The insulating material of the annular packing elements 87, 88 serves to define corresponding axial passages 97, 98 opening inwardly upon the annular passage 89 and outwardly upon a region of the borehole in which the conductive well fluid 13 is free to circulate. The packing elements 87, 88 are together supported dependently from housing 10 by means such as spaced supports 99 which afford an open region 100 for this circulation of conductive well fluid at the upper end of passage 97.

Spaced along the borehole and encircling the passage 97 of the upper packing element 87 are a pair of toroidal coils 102, 103 which are surrounded by the insulating material of the packing element. These coils may be of identical construction similar to the construction of coils 24 and 25 which are described above. In the packing element 93, similar toroidal coils 104 and 105 are disposed in a manner corresponding to the disposition of coils 102 and 103 in packing element 87. The coils 102–105 are thus coaxially spaced along the passages 97, 98, being arranged in pairs 102, 103 and 104, 105 above and below the annular passage 89 leading outwardly toward the adjacent formations.

Considering now the circuitry employed for energizing the coils and deriving induced signals therefrom, the alternating current source 27 is shown in FIG. 4 to be coupled to oscillator 33 in the same manner as described in connection with FIGS. 1 and 2. The output terminals of oscillator 33 are connected in a series circuit with the windings of toroidal coils 102 and 104 by means of insulated conductors 107, 108, the connection of the windings of these toroidal coils being such as to induce current flow in opposite directions along the borehole at any instant of time. That is, the toroidal coils 102 and 104 are excited in phase opposition so as to produce opposing flows of current.

The toroidal pick-up coils 103 and 105 are similarly connected in phase opposition by means of insulated conductors 109, 110 in a series circuit with the input terminals of amplifier 44. As in FIG. 2, the output circuit of the amplifier 44 is coupled to the input circuit of phase sensitive detector 46, which is supplied with a sensitizing voltage from oscillator 33. However, the output of phase sensitive detector 46 is coupled to the input of a D.C. servo amplifier 112 serving to control a servomotor 113 having its shaft 114 connected to the wiper of a potentiometer 115. The potentiometer 115 presents a variable resistance in series with a balancing winding provided by an insulated conductor 117. The winding 117 links each of the toroidal coils 102–105 with a single turn, being linked with respect to the emitter coils 102 and 104 in series aiding relation. Considering that the conductive paths afforded through passages 97 and 98 serve, respectively, to link coils 102 and 103 together and coils 104 and 105 together in a given sense, the winding 117 serves to link these same coils together in pairs in the opposite sense. Thus, current induced to flow through passage 97 by energization of coil 102 produces an induced potential in coil 103 of one sense, whereas current induced to flow in the winding 117 by energization of coil 102 induces a potential in coil 103 of the opposite sense. The coupling of coils 104 and 105 by the conductive path and by the winding 117 is similarly in opposition. By applying the sum of the potentials induced in the pick-up coils 103 and 105 for degenerative feedback control of the wiper position, the opposition afforded by the respective couplings of the coils is brought into balance.

With the resistance in the winding 117 negligible in comparison with the resistance of potentiometer 115, the adjusted value of the resistance for potentiometer 115 becomes a measure of the resistance encountered by the total flow of current laterally from the passage 89 into the adjacent formations, as will be explained more fully hereinafter. To derive an indication of the resistance of potentiometer 115, a source 118 of constant D.C. potential is connected by cable conductor 119 to a terminal of the potentiometer 115 and to a terminal of indicating device 51. A return circuit for D.C. current is provided in the same manner as described in connection with FIGS. 1 and 2, the ground point 56 in the housing 10 being connected to the wiper of potentiometer 115. Accordingly, the amount of D.C. current passed through the measure circuit is determined by the resistance of potentiometer 115 and produces a corresponding indication on device 51. The high frequency signal induced in winding 117 may be blocked from the measure circuit by series-connected choke 120, while a blocking capacitor 121 in series with the coupling winding 117 prevents a circulation of D.C. current in this winding.

In an exemplary operation of the apparatus of FIG. 4, the housing 10 together with the packing elements 87, 88 is moved through the borehole past formations to be investigated, while the record of indicating device 51 is correspondingly advanced. The oscillator 33 energizes the toroidal coils 102 and 104 with a constant energizing current $i_e$ having a constant frequency $f$. In consequence, a flow of current is induced in the direction of the arrows and alternately in the opposite direction, so that current induced to flow through passages 97 and 98 is combined in passage 89 to flow laterally of the borehole into adjacent earth formations. Because of the annular configuration of the passage 89, the current directed therethrough will have a generally annular sheet-like configuration.

By reason of current flow through passage 97, a potential is induced in the winding of toroidal coil 103. Similarly, by reason of current flow through passage 98, a potential is induced in toroidal coil 105. By combining these potentials additively, a signal is derived representing the total flow of current through passage 89 into the adjacent formations. However, a current flow in balancing winding 117 is also induced by excitation of toroidal coils 102 and 104, which induces an opposing potential in each of toroidal coils 103 and 105. By automatically adjusting the value of resistance of the potentiometer 115 by the degenerative feedback circuit responsive to the potentials induced in the coils 103, 105, a current is caused to flow through the compensating winding 117 which is equal to the average of the two current flow components through passages 97 and 98 or, in other words, to one-half the total current flowing through the annular passage 89. Since the induced potential in the balancing winding resulting from excitation of the toroidal coils 102 and 104 is twice the induced potential in either of the conductive paths through passages 97 and 98, it follows that the resistance of potentiometer 115 must be twice the average of the resistance values encountered in the two current flow paths. This resistance may be taken as proportional to the average formation resistivity over the region of measure and governs the D.C. current flowing in the measure circuit to produce corresponding indications of formation resistivity on the record of device 51.

It will be apparent that the packing elements 87, 88 may have different forms serving to define annular passage 89 and that the passage through one of the packing elements may be closed off, if desired, and the corresponding toroidal coils removed from the circuit. In the latter case, the flow through the annular passage 89 would be identical with the flow through the remaining axial passage. Other arrangements may be made for measuring the resistance of potentiometer 115, such as a bridge circuit or the like.

Figures 5, 6:
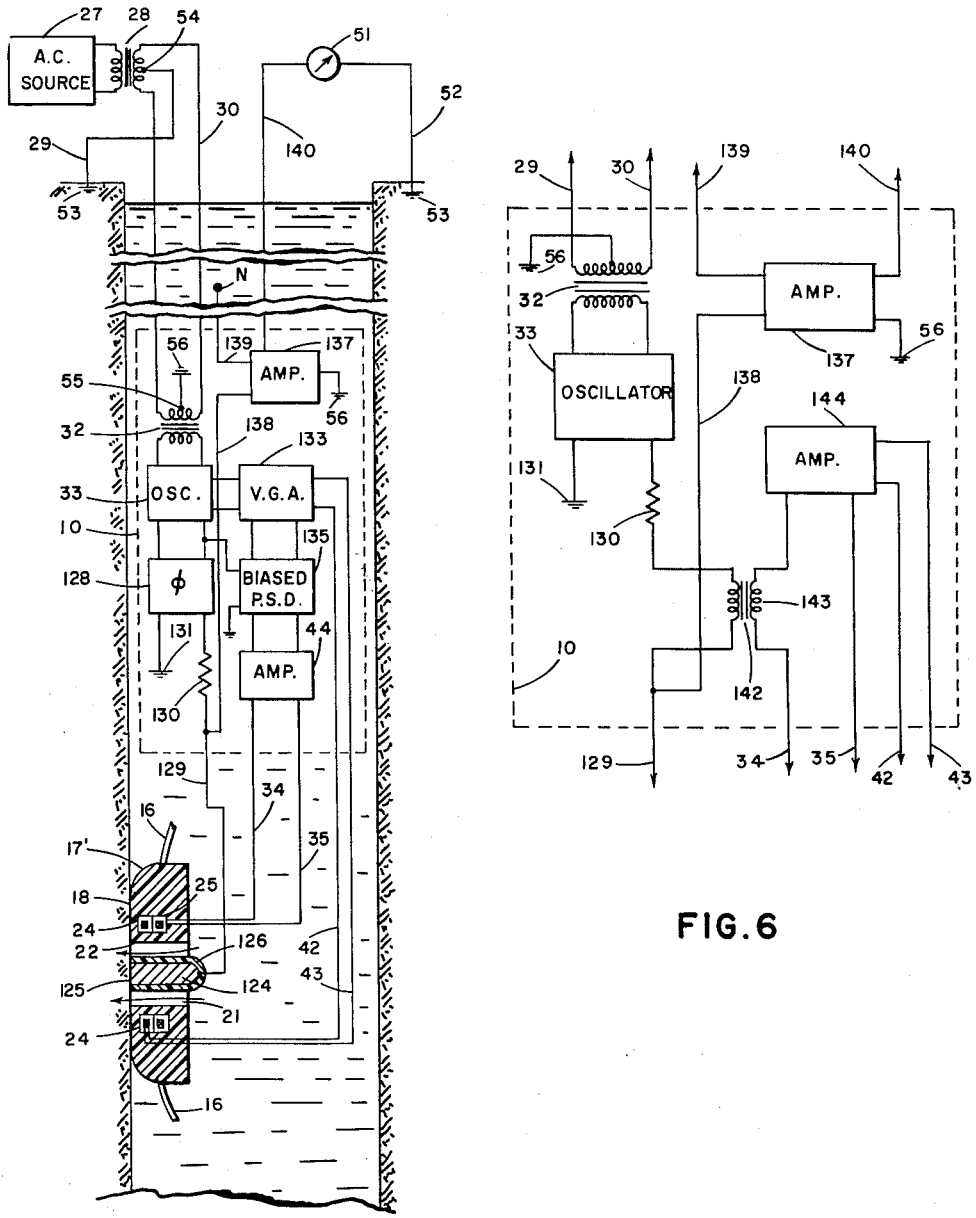
FIG. 5 is a schematic diagram of a modification wherein an electrode is positioned centrally of a passage through a cushion member having its face conformable to the borehole wall.
FIG. 6 is a schematic diagram of a circuit which may be employed with the coil and electrode assembly of FIG. 5.

In another form of the invention, which is illustrated in FIG. 5, a cushion member 17' is employed which is arranged in similarity to cushion member 17 of FIG. 1 but has disposed centrally of its transverse passage 21 an insulated electrode 124. The arrangement is such that current emitted from the electrode 124 is effectively focussed to penetrate the adjacent formations in a relatively confined, laterally directed beam.

The electrode 124 preferably has a uniform circular cross section extending the length of the passage 21 and has an exposed face 125 in the plane of the passage opening 22 from which current is emitted into the adjacent formations. The area of this face 125 is preferably related to the area of the opening 22 by a simple factor, such as a factor of two. An insulating sheath 126 covers the electrode, except for its face 125, to prevent short circuiting of currents which are induced by toroidal coil 24 to flow through the passage 21.

Oscillator 33, which is energized in the same manner as described in connection with FIGS. 1 and 2, has its output connected through a phase shifting circuit 128 to a current supply circuit for the electrode 124. This current supply circuit includes an insulated conductor 129 for connecting the electrode to an output terminal of phase shifting circuit 128, a high valued series resistor 130 serving to regulate the flow of current at a substantially fixed value, and a remote current return point 131 connected to the other output terminal of phase shifting circuit 128. The current return point 131 may be located a distance behind the cushion member 17' or at some distance along the borehole, as desired, in either case being substantially infinitely remote from electrode 124 in its effect upon the electric field thereabout.

The toroidal coil 24 is energized by connection via insulated conductors 42, 43 to the output terminals of a variable gain amplifier 133, the input circuit of which is energized by connection to oscillator 33. Since the current which is induced to flow through conductive fluid in passage 21 by energization of coil 24 is not in phase with the output potential of oscillator 33, it is the purpose of phase shifting circuit 128 to render current emitted from electrode 124 correspondingly out of phase by phase angle $\phi$, which may, for example, be 90°, so that current passing from the electrode 124 and from the annular passage 21 therebout is in phase. The magnitude of the energizing current $i_e$ supplied to coil 24 is, however, varied whereas the current emitted from electrode 124 is maintained substantially constant.

To obtain the desired focusing of the current emitted from the electrode 124, the coil 24 is energized to pass a current through the annular passage 21 which has substantially the same current density as current emitted from the face 125 of electrode 124. Since the areas of the face 125 and of the total opening 22 for the passage 21 stand in ratio of 1 to 2 (or other desired ratio), the cross sectional area of the conductive fluid in opening 22 is equal to the cross sectional area of the face 125. To obtain equal current densities, therefore, the respective currents must be equal (or related as the areas).

In accordance with the invention, toroidal pick-up coil 25 serves not only to detect the amount of current flowing through conductive fluid in the annular passage 21 but additionally to detect current flowing through electrode 124. The potential $e_r$ induced in the pick-up coil 25, which is, therefore, proportional to the total current emitted from the cushion member 17', is supplied via insulated conductors 34, 35 to the input of amplifier 44 and, in amplified form, is applied to the input of a biased phase sensitive detector 135 of any suitable design. The phase sensitive detector is sensitized by a reference signal from oscillator 33 at the phase angle of its output potential, whereby the output of the phase sensitive detector is of a polarity and magnitude representing departure of the potential $e_r$ induced in coil 25 from a prescribed, biasing value. The value of the bias potential developed in the detector 135 is determined by the ratio of areas and, in the exemplary case of equal areas in the conductive fluid and the electrode, will correspond to twice the potential induced in coil 25 by the constant current passing through electrode 124.

Accordingly, departure of the induced potential $e_r$ in coil 25 from a value which represents equality of the current densities in the conductive fluid and the electrode 124 at the opening 22 results in a signal of corresponding polarity produced at the output of detector 135. This signal is applied to the gain control circuit of the variable gain amplifier 133 degeneratively to control the magnitude of the energizing current supplied to coil 24, whereby a substantially constant current density across the opening 22 is obtained.

To secure indications of formation resistivity along the path of current emitted from the electrode 124, the absolute potential of a point in the vicinity of this electrode with respect to ground may be measured. Conveniently, the potential of electrode 124 with respect to a remote reference electrode N is measured in a practical arrangement, as by connecting the input terminals of a measure circuit amplifier 137 to the electrode 124 and to the electrode N via conductors 138 and 139, respectively. The output terminals of amplifier 137 are connected to the ground point 56 and via cable conductor 140 to a suitable indicating device, such as the recording device 51. A phantom ground return circuit is provided as described in connection with FIGS. 1 and 2.

In operation, the cushion member 17' together with the housing 10 is moved through the borehole past formations to be investigated while the record of the indicating device 51 is correspondingly advanced. From the electrode 124, current at a phase angle $\phi$ with respect to the oscillator output potential is emitted into adjacent formations with a current density at the borehole wall determined by the area of the electrode face 125. Because the magnitude of the emitted current is maintained substantially constant, the current density is likewise substantially constant. To achieve a focusing of the emitted current, auxiliary current flowing from the annular passage 21 into the borehole wall may suitably have the same current density and be in phase with the current emitted from the electrode.

Flow of this auxiliary current is induced by energization of toroidal coil 24 with the current output of variable gain amplifier 133. Phase correspondence of the emitted current and auxiliary current is obtained by setting the phase angle $\phi$ introduced by phase shifting circuit 128 equal to the phase lag between the auxiliary current induced by coil 24 and the excitation voltage supplied the variable gain amplifier 133 by the oscillator 33. With the emitted current from electrode 124 having a substantially constant value of current density, equality of the current densities of the emitted and auxiliary currents requires that the auxiliary current have a fixed value determined by the relative cross sectional areas for these currents in the plane of the face 18. Thus, both the currents must be substantially fixed and, accordingly, their sum must have a substantially fixed value. Knowing the ratio of the cross sectional areas and the fixed value of the current emitted from the electrode, the total current required may readily be determined. When this total current flows, a correspondingly fixed potential is induced in toroidal coil 25, equal to the bias potential in the phase sensitive detector 135. In other words, when the correct total current is flowing from the cushion member 17', the output of the phase sensitive detector has a zero deviation from its central value.

By applying the output of the phase sensitive detector 135 to the gain control section of the variable gain amplifier 133, the energizing current flowing to the toroidal coil 24 is degeneratively controlled to ensure that the total current emitted remains at the desired, fixed value necessary for a uniform current density. While uniformity of current density is not maintained at an indefinite distance from the face 18 of cushion member, the uniformity at the borehole wall leads to a focusing of the current emitted from the electrode such that this current serves to create potentials in the vicinity of the electrode characterizing formation resistivity at an appreciable distance beyond the borehole wall. Indications of this formation resistivity are conveniently secured by the responsce of indicating device 51 to the potential difference between electrode 124 and the remote reference electrode N.

While the focusing of the current emitted from electrode 124 which results from the uniformity of current density may yield resistivity indications of a type susceptible of mathematical interpretation, the total current may be maintained at a value other than that which results in uniform current density in order to achieve effectively an over-focusing or under focusing, as desired. Thus, by increasing the current flowing through passage 21 so as to have a greater current density than current emitted from electrode 124, the emitted current will tend to flow in a convergent beam in the vicinity of the electrode, which may be referred to as overfocused. With a smaller total current and, hence, a smaller current through passage 21, the relatively higher current density of current emitted from electrode 124 tends to result in a divergent current beam which may be referred to an underfocused.

In a modification of the system of FIG. 5, circuitry shown in FIG. 6 may be substituted for circuitry shown in FIG. 5 within housing 10. Similar portions of the substituted circuitry are identified by like reference numerals. Serially connected between current regulating resistor 130 and electrode 124 is the primary winding of a transformer 142. The secondary winding 143 of this transformer is connected in series opposing relation with toroidal pick-up coil 25 and the input terminals of a feedback amplifier 144. Amplifier 144, which preferably has a high gain, has its output terminals connected by conductors 42, 43 to toroidal coil 24 to energize the same in accordance with an amplified version of the difference between the fixed potential induced in the secondary winding 143 and the potential induced in toroidal coil 25.

In an exemplary operation of the apparatus of FIG. 5 modified in accordance with FIG. 6, the amplifier 144 provides degenerative feedback control of the energization of toroidal coil 24. This control effects an adjustment in the current induced to flow through passage 21 such that the total of this current and the fixed current emitted from electrode 124 induces a potential in toroidal 25 having a substantially constant value equal to the fixed potential induced in the secondary winding 143 by the fixed current flowing to electrode 124. In accordance with the selected turns ratio of transformer 142, the current emitted from electrode 124 is focused normally, or under or over focused. Indications of formation resitivity are derived in the manner described above in connection with FIG. 5.

Various other modifications may be made in the embodiment of FIG. 5 as well as in the other embodiments of the invention, as will occur to those skilled in the art. Accordingly, the invention is not to be limited to the particular embodiments shown and described but is of a scope defined in the appended claims.

I claim:

1. In apparatus for investigating earth formations traversed by a borehole, the combination comprising first and second toroidal coils mounted for movement through a borehole, insulating means defining an insulation-bounded current flow passage having two outlets and extending through central regions of said toroidal coils, an exterior surface portion of said insulating means surrounding at least one of said outlets being adapted to be urged into sealing engagement with the borehole wall, electric source means coupled to said first toroidal coil for producing a flow of current through said current-flow passage into adjacent formations, and means coupled to said second toroidal coil for deriving a signal representing the amount of current flowing through said passage.

2. In apparatus for investigating earth formations traversed by a borehole, the combination comprising first and second toroidal coils mounted for movement through a borehole, insulating means defining an insulation-bounded current flow passage having two outlets and extending through central regions of said toroidal coils, an exterior surface portion of said insulating means surrounding at least one of said outlets being conformable to the borehole wall, means for resiliently urging said exterior surface portion into sealing engagement with the borehole wall, electric source means coupled to said first toroidal coil for producing a flow of current through said current-flow passage into adjacent formations, and means coupled to said second toroidal coil for deriving a signal representing the amount of current flowing through said passage.

3. In apparatus for investigating earth formations traversed by a borehole, the combination comprising first and second toroidal coils mounted for movement through a borehole, insulating means surrounding said toroidal coils and defining a passage therethrough for containing an electrolyte, said insulating means including a portion disposed about at least one opening of said passage and resiliently urged into sealing engagement with the borehole wall, electric source means coupled to said first toroidal coil for producing a flow of current through said one opening into adjacent formations, and means coupled to said second toroidal coil for deriving a signal representing the amount of current flowing through said one opening.

4. In apparatus for investigating earth formations traversed by a borehole, the combination comprising a cushion member having an insulated passage therethrough and a face disposed about at least one opening of said passage for sealing engagement with the borehole wall, first and second toroidal coils encircling said passage for movement with said cushion member along the borehole, said face being composed of insulating material and resiliently urged toward the borehole wall, electric source means coupled to said first toroidal coil for producing a flow of current through said one opening into adjacent formations, and means coupled to said second toroidal coil for deriving a signal representing the amount of current flowing through said one opening.

5. In apparatus for investigating earth formations traversed by a borehole containing conductive fluid, the combination comprising first and second toroidal coils mounted for movement through a borehole, insulating means defining a passage through said toroidal coils containing conductive fluid and having an opening for resiliently sealing with the borehole wall, said insulating means extending about said opening to define a face conformable to the borehole wall, electric source means coupled to said first toroidal coil for producing a flow of current through said opening into the adjacent formations, and means responsive to the potential induced in said second toroidal coil for providing indications of formation conductivity.

6. In apparatus for investigating earth formations traversed by a borehole containing conductive fluid, the combination as defined in claim 5, wherein said potential responsive means includes a phase sensitive detector sensitized by a signal from said electric source means to provide a rectified version of the potential induced in said second toroidal coil.

7. In apparatus for investigating earth formations traversed by a borehole, the combination comprising first and second toroidal coils mounted for movement through a borehole and spaced apart from one another in a longitudinal borehole direction with the toroid axes orientated perpendicularly to the longitudinal axis of the borehole, insulating means defining an insulation-bounded current flow passage connecting the central regions of said toroidal coils and having an opening adjacent each toroidal coil for resiliently sealing with the borehole wall, said insulating means extending about said openings to define a face conformable with the borehole wall, means located within said passage for enabling current to pass therethrough, electric source means coupled to said first toroidal coil for producing a flow of current through said openings into the adjacent formations, and means coupled to said second toroidal coil for deriving a signal varying as a function of the current flowing through said openings.

8. In apparatus for investigating earth formations traversed by a borehole, the combination comprising first and second toroidal coils mounted for movement through a borehole, insulating means defining a passage through said toroidal coils containing conductive fluid and having an opening at either end for resiliently sealing with the borehole wall, said insulating means extending about said openings to define a face conformable with the borehole wall, electric source means coupled to said first toroidal coil for supplying energizing current to produce a flow of current through said openings into the adjacent formations, means responsive to the potential induced in said second toroidal coil for varying said energizing current so as to maintain said induced potential substantially constant, and means responsive to said energizing current for providing indications of the resistivity of the formations adjacent said openings.

9. In apparatus for investigating earth formations traversed by a borehole, the combination comprising first and second toroidal coils mounted for movement through a borehole, insulating means defining a passage through said toroidal coils having at least one opening for resiliently sealing with the borehole wall, means for retaining an electrolyte in said passage to afford a conductive path through said passage, electric source means coupled to said first toroidal coil for producing a flow of current in said electrolyte which passes through said opening into the adjacent formations, and means responsive to the potential induced in said second toroidal coil for producing a signal which varies as a function of said current.

10. In apparatus for investigating earth formations traversed by a borehole containing conductive fluid, the combination comprising first and second toroidal coils mounted for movement through a borehole with the toroid axes parallel to the longitudinal axis of the borehole, insulating means defining a passage through the central regions of said toroidal coils and encircling the exterior of said coils for resiliently sealing with the borehole wall, electric source means coupled to said first toroidal coil for producing a flow of current through said opening into the adjacent formations, and means coupled to said second toroidal coil for producing a signal which varies as the current passing through said opening.

11. In apparatus for investigating earth formations traversed by a borehole containing conductive fluid, the combination comprising first and second pairs of toroidal coils mounted for movement through a borehole with the toroid axes parallel to the longitudinal axis of the borehole, first insulating means defining a passage through the central regions of the first pair of toroidal coils and encircling the exterior of said first coils for resiliently sealing with the borehole wall, second insulating means defining a passage through the central regions of the second pair of toroidal coils and encircling the exterior of said second coils for resiliently sealing with the borehole wall, said first and second insulating means being spaced a short distance apart in a longitudinal borehole direction to define a region connecting said coil passages to an annular portion of the borehole wall, electric source means coupled to one toroidal coil of each pair for producing a flow of current through said annular portion of the borehole wall into the adjacent formations, and means coupled with the other toroidal coil of each pair for providing a signal which varies as a function of formation resistivity.

12. In apparatus for investigating earth formations traversed by a borehole containing conductive fluid, the combination comprising first and second toroidal coils mounted for movement through a borehole, insulating means defining an insulation-bounded current flow passage having two outlets and extending through central regions of said toroidal coils and containing conductive fluid, an exterior surface portion of said insulating means surrounding at least one of said outlets being adapted to be urged into sealing engagement with the borehole wall, electric source means coupled to said first toroidal coil for producing a flow of current through said current-flow passage into the adjacent formations and about said toroidal coils, and means including a balancing winding extending about one of said coils in the same sense as, and the other of said coils in the opposite sense as said current for deriving a signal varying as a function of formation resistivity.

13. In apparatus for investigating earth formations traversed by a borehole containing conductive fluid, the combination as defined in claim 12 which includes a variable resistance in series with said balancing winding, and degenerative feedback means coupled to said second toroidal coil for adjusting said variable resistance to reduce the potential induced in said second toroidal coil substantially to zero, whereby the value of said variable resistance represents the resistivity of formations traversed by said current.

14. In apparatus for investigating earth formations traversed by a borehole containing conductive fluid, the combination comprising an electrode, first and second toroidal coils mounted for movement with said electrode through a borehole, insulating means defining a passage through said toroidal coils containing conductive fluid and having an annular opening about an exposed face of said electrode, said insulating means extending about said opening to define a face conformable with the borehole wall, electric source means coupled to said electrode and to a remote current return point for emitting a first current from said electrode into adjacent formations, electric source means coupled to said first toroidal coil and responsive to the potential induced in said second coil for causing a second current to flow through said opening into the adjacent formations, and means responsive to a potential difference produced by said currents between a point in the vicinity of said electrode and a reference point for producing a signal varying as a function of formation resistivity.

15. In apparatus for investigating earth formations traversed by a borehole containing conductive fluid, the combination comprising an electrode, first and second toroidal coils mounted for movement with said electrode through a borehole, insulating means defining a passage through said toroidal coils containing conductive fluid and having an annular opening about said electrode for resiliently sealing with the borehole wall, electric source means coupled to said electrode and to a remote current return point for emitting a first current from said electrode into adjacent formations, means coupled to said first toroidal coil for passing a second current in phase with said first current through said annular opening into adjacent formations, means coupled with said second toroidal coil and responsive to the sum of said first and second currents for maintaining said second current at a value fixed in proportion to the value of said first current, and means responsive to the potential difference between a point in the vicinity of said electrode and a remote reference point for deriving indications which are a function of formation resistivity.

16. In apparatus for investigating earth formations traversed by a borehole containing conductive fluid, the combination comprising an electrode, first and second toroidal coils mounted for movement with said electrode through a borehole, insulating means defining a passage through said toroidal coils containing conductive fluid and having an annular opening about an exposed face of said electrode, said insulating means extending about said opening to define a face conformable with the borehole wall, electric source means coupled to said electrode and to a remote current return point for emitting a first steady current from said electrode into adjacent formations, feedback amplifier means having its input connected to said second toroidal coil and inductively coupled with said electric source means and responsive to a difference of induced potentials for energizing said first toroidal coil to cause a second current to flow through said opening into the adjacent formations, and means responsive to a potential difference produced by said currents between a point in the vicinity of said electrode and a reference point for producing a signal varying as a function of formation resistivity.

17. In a method of investigating earth formations traversed by a borehole containing conductive fluid, the steps comprising electrically insulating portions of the borehole wall in a given locality to establish a defined current path extending between different locations along the wall of the borehole, producing an alternating magnetic flux encircling said path to induce a flow of current therethrough and into adjacent formations, and deriving a signal which varies as a function of said current.

18. In a method of investigating earth formations traversed by a borehole containing conductive fluid, the steps comprising passing a first current between a location substantially against a sidewall of the borehole into the adjacent formations, establishing a magnetic field encircling said location to induce a second current to flow from an annular region about said location into the adjacent formations, adjusting one of said currents to obtain a predetermined ratio of densities of said currents in the vicinity of the borehole wall, and deriving a signal which varies as a function of the potential difference between a point near said location and a remote reference point.

References Cited in the file of this patent

UNITED STATES PATENTS

| | | |
|---|---|---|
| 2,333,883 | Piety | Nov. 9, 1943 |
| 2,542,057 | Relis | Feb. 20, 1951 |
| 2,582,315 | Doll | Jan. 15, 1952 |
| 2,719,948 | Zimmerman | Oct. 4, 1955 |

UNITED STATES PATENT OFFICE
CERTIFICATE OF CORRECTION

Patent No. 2,987,668　　　　　　　　　　　　　　June 6, 1961

Michel Gondouin

It is hereby certified that error appears in the above numbered patent requiring correction and that the said Letters Patent should read as corrected below.

Column 1, line 14, for "now Patent No. 2,881,385" read -- now abandoned, --.

Signed and sealed this 31st day of October 1961.

(SEAL)
Attest:

ERNEST W. SWIDER　　　　　　　　　　　　　　DAVID L. LADD
Attesting Officer　　　　　　　　　　　　　　　Commissioner of Patents

USCOMM-DC